June 17, 1952  M. FRIEDMAN  2,600,526
RECHARGEABLE DRY CELL BATTERY
Filed May 5, 1950
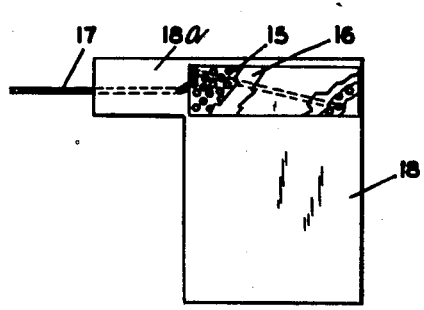
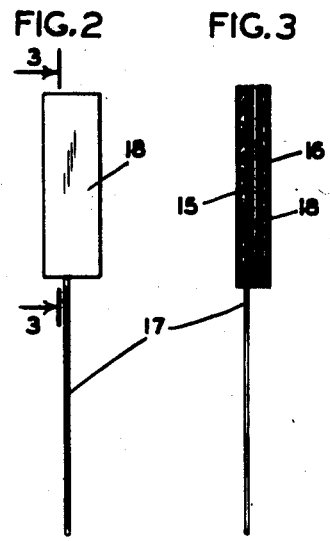
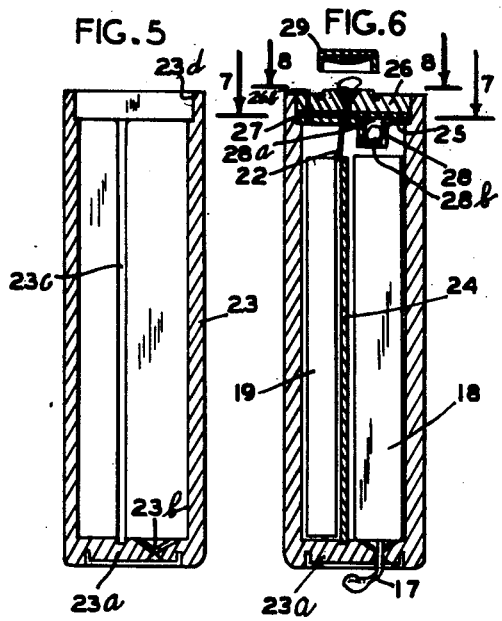
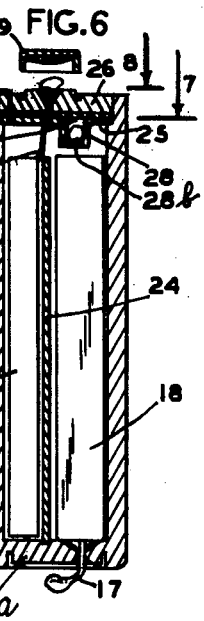
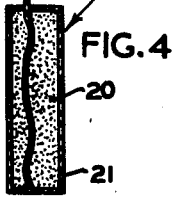
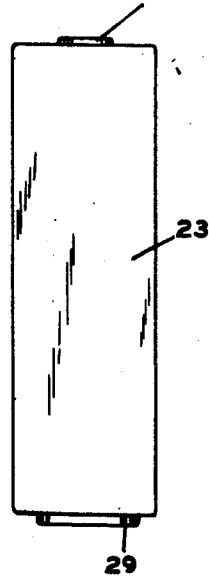
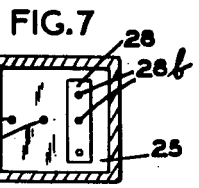
INVENTOR
MAURICE FRIEDMAN
BY
*Williamson & Williamson*
ATTORNEYS

Patented June 17, 1952

2,600,526

UNITED STATES PATENT OFFICE 2,600,526

RECHARGEABLE DRY CELL BATTERY

Maurice Friedman, St. Paul, Minn., assignor to Galvanic Products Corporation, Valley Stream, N. Y., a corporation of New York Application May 5, 1950, Serial No. 160,189

5 Claims. (Cl. 136—30)

This invention relates to dry cell batteries.

It is an object of my invention to provide a battery of the type generally known as a dry cell, in which the parts of the battery combine to form a unit which is highly resistant to internal short-circuits and which is particularly adapted to be repeatedly recharged.

It is another object to provide a rechargeable dry cell battery which may be stored for relatively long periods of time without requiring recharging thereof.

More specifically, it is an object to provide a battery having an electrolyte absorbent material surrounding the negative electrode to maintain substantially all of the electrolyte in close proximity thereto, having a partition formed between the positive and negative electrodes to interfit with the battery casing and separate said electrodes, the electrodes of said cell being wrapped with a confining material which will permit the electrolyte to pass therethrough.

It is another object to provide a dry cell battery having the lead wire from the positive electrode securely sealed to each of a pair of closure partitions in the end of a casing and a somewhat porous resilient element interposed between said partitions to permit restricted flow of hydrogen gas through the vent openings therein but preventing the flow of electrolyte from the casing.

It is a further object to provide a battery using a zinc negative electrode and a silver oxide positive electrode with electrolyte of potassium hydroxide in which said electrolyte is localized around the negative zinc electrode in which a plurality of apertures have been made to form reservoirs for the electrolyte within the zinc electrode to increase the area of contact between the electrolyte and the zinc electrode and to facilitate attachment of the negative lead wire to said perforated zinc plate.

These and other objects and advantages of my invention will more fully appear from the following description made in connection with the accompanying drawings wherein like reference characters refer to similar parts throughout the several views and in which:

Fig. 1 is a side elevational view of the negative zinc electrode with portions of the packing broken away and showing the wrapping sheet before the same is wrapped around the packed zinc plate;

Fig. 2 is an elevational view showing the wrapped zinc electrode;

Fig. 3 is a longitudinal sectional view taken substantially along the line 3—3 of Fig. 2;

Fig. 4 is a longitudinal sectional view of the positive electrode;

Fig. 5 is a longitudinal sectional view of the battery casing with the electrodes and the separator partition removed;

Fig. 6 is a central longitudinal sectional view taken through the assembled battery cell with the positive terminal removed;

Fig. 7 is a transverse sectional view taken substantially along the line 7—7 of Fig. 6;

Fig. 8 is a top plan view of the battery shown in Fig. 6 as viewed from a plane along the line 8—8 of Fig. 6;

Fig. 9 is a perspective view of the zinc electrode showing the chromate coating thereon and illustrating the anchoring means for the terminal lead wire;

Fig. 10 is a perspective view of one of the terminal caps;

Fig. 11 is a vertical sectional view of the cap shown in Fig. 10; and

Fig. 12 is a side elevational view of the completed cell.

As illustrated in the accompanying drawings, a battery is shown in which the component elements combine to form a cell which is particularly resistant to internal short circuits and thus is adapted to be repeatedly recharged. Figs. 1, 2, 3 and 9 illustrate the negative electrode of the battery which, in the form illustrated, consists in a perforated zinc plate designated by the numeral 15. The zinc plate 15 is surrounded by a suitable absorbent packing material such as the felt 16 which is adapted to hold most of the electrolyte liquid in close proximity to the zinc plate. A lead wire 17 made from any electrical conductive material such as silver is easily anchored to the perforated plate by having portions thereof threaded through the perforations of the plate. In order to properly confine the electrode and the surrounding packing material a wrapping of any suitable material, such as the cellophane wrapper 18 is secured around the electrode, the flap 18a closing the lower end of the electrode from which the lead wire 17 extends while the upper end thereof is left open to permit the escape of gases from the reactions surrounding the zinc plate. This wrapping material permits the electrolyte to flow therethrough to carry the electrons from the zinc plate to the positive electrode.

The positive electrode 19 in the form illustrated is formed from compacted silver oxide 20 and is similarly wrapped in the cellophane wrapper 21 to positively confine the silver oxide particles. The wrapper 21 has flaps similar to flap 18a of wrapper 18 at both the top and the bottom thereof. Since no gas is formed around the positive electrode the top need not be open and the compacted billet is better confined by closing the top. A lead wire 22 is embedded in the compacted silver oxide.

An elongated casing 23 is best shown in Figs. 5 and 6 and has a substantially closed bottom 23a with the aperture 23b formed therethrough to permit the lead wire from the negative electrode to extend through the casing bottom. The casing is made from any suitable caustic resistant material such as a polystyrene plastic and the lead wire of the negative electrode is sealed to the casing bottom by the use of the monomer of the styrene plastic which with the aid of suitable catalysts forms a seal which has the same coefficient of expansion as the rest of the case and which closely adheres to the silver lead wire to prevent leakage of the electrolyte. The bottom 23a has a groove formed thereacross and this groove extends up the two sides of the casing and is designated as an entirety by the numeral 23c. The purpose of this groove will be brought out subsequently. The positive electrode 19 is inserted into the casing 23 in spaced relation to the negative electrode and the lead wire 22 extends upwardly through the open top of said casing. A partition 24 which in the form shown is made from an asbestos paper is inserted into the groove 23c and separates the positive and negative electrodes and combines with the absorbent packing, the perforations in the zinc electrode, and the cellophane wrapping surrounding the zinc electrode and the silver oxide electrode to prevent internal short circuits between the two electrodes.

A recess 23d is formed in the top portion of casing 23, as best shown in Figs. 5 and 6, and a pair of closure partitions 25 and 26 are inserted into said recess with the lead wire from the positive electrode being threaded through the apertures 25a and 26a respectively formed in said partitions 25 and 26. The aperture 26a is centrally formed in the closure partition 26. However, the aperture 25a is slightly offset from the center of partition 25, as best shown in Figs. 6 and 7. A pair of aligned vent openings 25b and 26b are respectively formed in the partitions 25 and 26 and a relatively porous liquid confining gas releasing gasket 27 is interposed between the two partitions 25 and 26, as best shown in Fig. 6. Synthetic rubber, such as neoprene or crepe rubber, have been found satisfactory for this purpose and permit the restricted flow of gas therethrough. In the event that a safety valve is desired a very small normally closed (pin-prick) opening through gasket 27 to permit the release of excessive gas pressures within the casing may be provided.

A catalyst retaining recess 28 is formed in the partition 25 and extends across above the negative electrode as best shown in Figs. 6 and 7. This recess 28 contains any suitable catalyst for converting hydrogen gas to water, such as 10% palladium on asbestos. The recess 28 has an opening 28a in the upper portion thereof to permit hydrogen gas to enter the same and has a number of openings 28b in the bottom thereof to permit the water formed therein to drain back into the electrolyte surrounding the zinc electrode through the unwrapped end of the negative electrode package.

Normally when the zinc plate is exposed to the air zinc oxide, as well as zinc carbonite, will be formed on the outside thereof. To combat this I have found that coating the surface of the zinc with a chromate film will prevent this reaction. This coating not only prevents the formation of the zinc oxide and zinc carbonate, but also cuts down the reaction of the potassium hydroxide on the impurities in the zinc and thus reduces the formation of hydrogen gas when the batteries are stored (on shelf).

The presence of the chromate ions in the hydroxide solution materially reduces the solubility of the silver oxide in the potassium hydroxide so as to aid in preventing direct shorts within the cell. Also these chromate ions have a binding effect on the spongy zinc oxide to prevent migration of particles of zinc oxide away from the plate 15.

When the battery is in use the potassium hydroxide electrolyte carries the electrons from the zinc electrode through the celophane wrapper therearound through the separator partition and over to the positive electrode 19 where the potassium hydroxide passes through the celophane wrapper to deposit said electrons onto the silver oxide electrode. The chromate ions reduce the solubility of the silver oxide in the potassium hydroxide electrolyte as well as preventing migration of the spongy zinc oxide material formed upon oxidation of the zinc plate. This, along with the wrapping around both electrodes, the mounting of the separator 24 between the electrodes, the immobilizing of most of the potassium hydroxide around the zinc plate, as well as the formation of the reservoirs within the zinc plate by the perforations therein, all combine to form a cell which will be extremely resistant to internal short-circuits and which is adapted to repeated recharging. The double seal around the positive lead wire materially prolongs the life of the cell and by producing a seal having the same coefficient of expansion as the casing a substantially permanent seal is formed around each lead wire.

A pair of terminal caps 29 are respectively soldered to the terminal leads to form a positive connection therewith. These caps 29 are respectively mounted in recesses respectively formed in the bottom of the casing and the outer partition 26 to provide a substantially flush terminal at each end of the completed cell. In the form shown one of the caps 29 is somewhat larger than the other in order to facilitate differentiating the positive from the negative terminal.

It will be seen that I have provided a relatively simple extremely compact and highly efficient battery of the dry cell type in which the electrodes thereof are elongated and substantially box-shaped to permit insertion thereof into the battery casing. The construction of the electrodes as well as the casing and the seal formed at the terminals all co-operate to produce with surprising results a repeatedly rechargeable dry cell battery.

It will, of course, be understood that various changes may be made in the form, details, arrangement and proportions of the parts without departing from the scope of my invention.

What I claim is:

1. A rechargeable dry cell battery comprising a casing; a negative metallic electrode mounted in said casing and consisting in a metallic plate, an absorbent material surrounding said plate, and a wrapper surrounding said absorbent material to confine the same around said plate; a positive electrode mounted in said casing, an electrolyte for the most part absorbed in said absorbent material surrounding said negative electrode and adapted to flow through said wrapper to said positive electrode; a separator plate interposed between said positive electrode and said negative electrode and dividing said casing into two chambers and adapted to permit the passage of electrolyte therethrough but confining each electrode within its respective chamber; a pair of terminals formed on the outside of said casing; and means for respectively interconnecting said electrodes with said terminals.

2. The structure set forth in claim 1 and said casing having an internal groove formed therein to receive the separator partition therein and form a substantial seal with the marginal edge portions of said partition.

3. The structure set forth in claim 1 and said terminals being formed at opposite ends of said casing, a pair of closure partitions formed adjacent the positive terminal, a lead wire extending from the positive electrode through said partions to the positive terminal, a homogeneous seal formed between said lead wire and each of said partitions having the same co-efficient of expansion as the partitions to positively prevent leakage at the positive terminal of the battery.

4. The structure set forth in claim 3 and each of said closure partitions having at least one vent opening therein, said vent openings being substantially aligned, and a resilient, somewhat porous gasket interposed between said partitions to permit passage of hydrogen gas formed in said cell on standing through said vent openings.

5. A zinc electrode for dry cell batteries comprising a perforated zinc plate, a lead wire securely anchored to said zinc plate by being threaded through certain of the perforations therein, a chromate coating covering the surface of said zinc plate to serve as a binder for the zinc oxide formed on discharge thereof, an absorbent material closely packed around said zinc plate and a wrapper envelope made from a slightly porous thin sheet and closely surrounding said absorbent material to hold the same in close contact with said zinc plate while permitting the flow of electrolyte through said wrapper.

MAURICE FRIEDMAN.

REFERENCES CITED

The following references are of record in the file of this patent:

UNITED STATES PATENTS

| Number | Name | Date |
| --- | --- | --- |
| 1,021,989 | Morrison | Apr. 2, 1912 |
| 2,131,592 | Lange et al. | Sept. 27, 1938 |
| 2,317,711 | Andre | Apr. 27, 1943 |